United States Patent [19]

Topper et al.

[11] Patent Number: 4,758,882

[45] Date of Patent: Jul. 19, 1988

[54] CHROMINANCE DETECTION CIRCUIT COMPARING THE POLARITY OF HIGH FREQUENCY SIGNALS SEPARATED BY A FIELD OR FRAME

[75] Inventors: Robert J. Topper, Hatboro, Pa.; Lee R. Dischert, Burlington, N.J.

[73] Assignee: Matsushita Electric Industrial Co., Ltd., Osaka, Japan

[21] Appl. No.: 60,098

[22] Filed: Jun. 9, 1987

[51] Int. Cl.$^4$ .......................... H04N 9/64; H04N 9/78
[52] U.S. Cl. ..................................... 358/21 R; 358/31
[58] Field of Search .................... 358/21 R, 26, 31, 36

[56] References Cited

U.S. PATENT DOCUMENTS 4,072,984  2/1978  Kaiser .................................. 358/31
4,240,105  12/1980  Faroudja ............................. 358/31

FOREIGN PATENT DOCUMENTS 40381      4/1981  Japan ................................... 358/31
2054313    2/1981  United Kingdom ................. 358/31
2066615    7/1981  United Kingdom ................. 358/31

Primary Examiner—John W. Shepperd
Attorney, Agent, or Firm—Amster, Rothstein & Ebenstein

[57] ABSTRACT

A circuit to detect the presence of the chrominance signal in a composite signal is disclosed. Advantage is taken of the fact that the polarity of luminance signals in two fields or frames is the same whereas the polarity of chrominance signals is opposite. The circuit uses a band pass filter to select the chrominance and high frequency luminance signals, a polarity detector, a field or frame delay, and an XOR having the delayed and nondelayed outputs of the polarity detector as inputs. The output can be used to modify the decoding circuits when a purely black and white image is present.

2 Claims, 2 Drawing Sheets

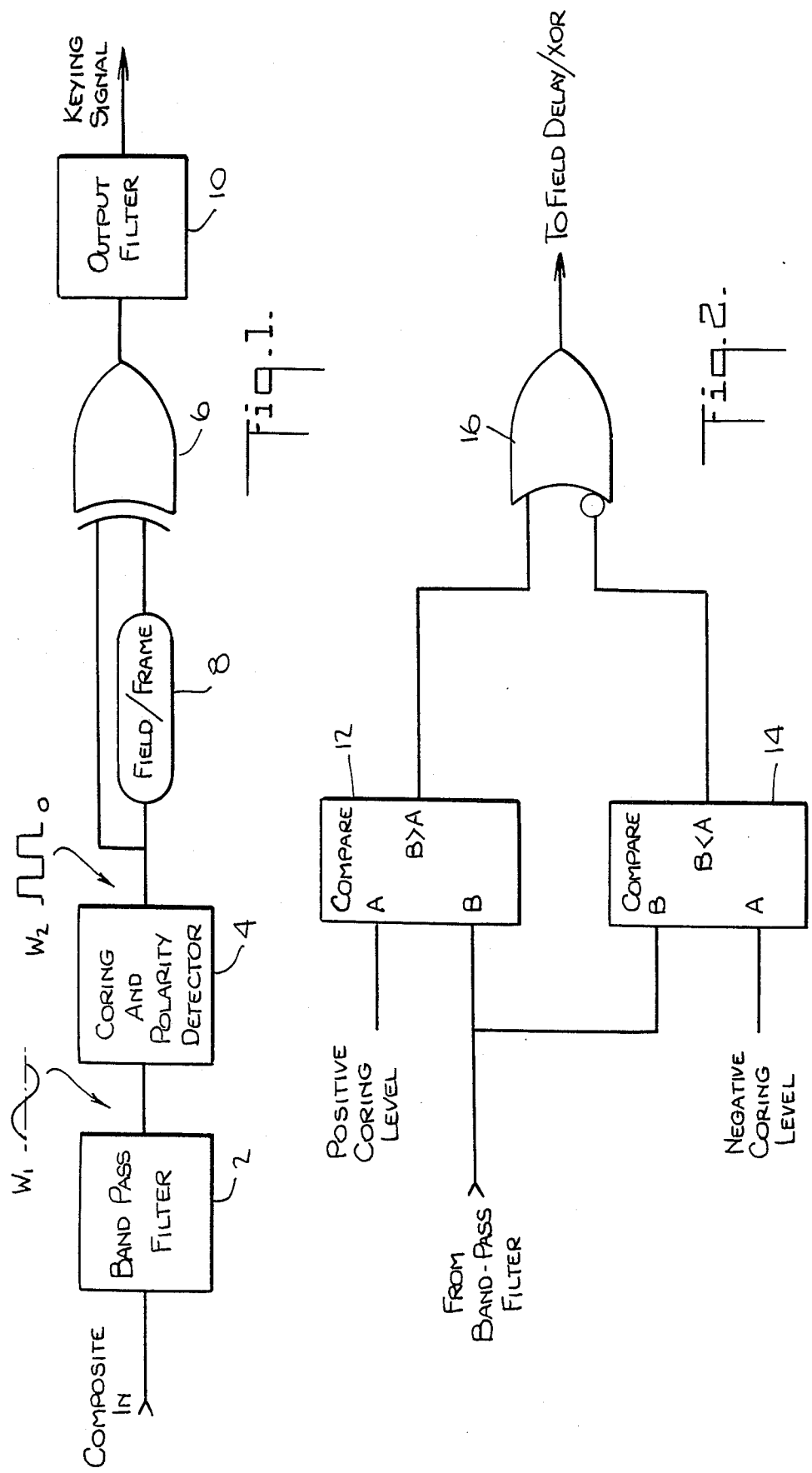

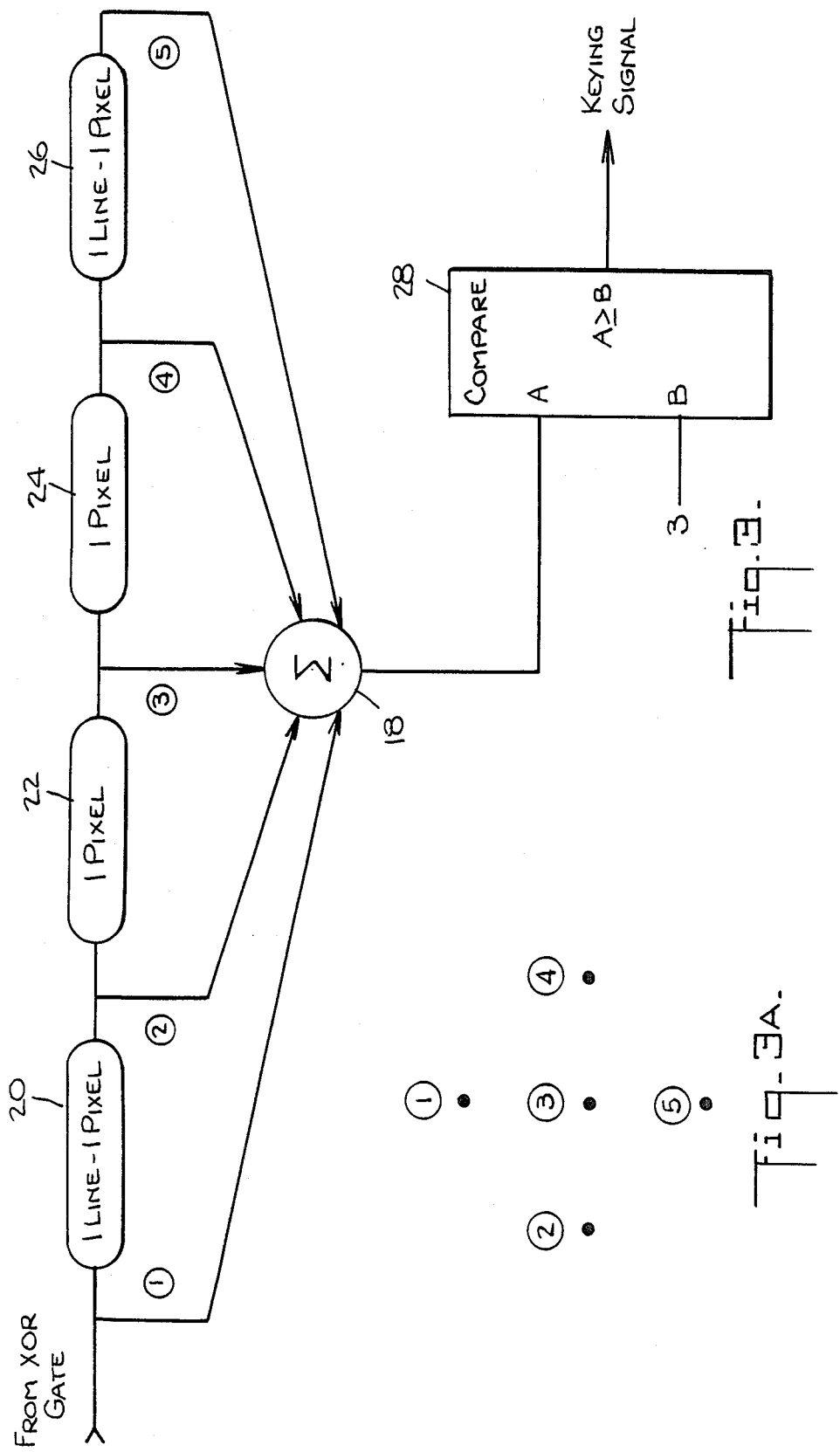

CHROMINANCE DETECTION CIRCUIT COMPARING THE POLARITY OF HIGH FREQUENCY SIGNALS SEPARATED BY A FIELD OR FRAME

BACKGROUND OF THE INVENTION

In the transmission of color television signals by the NTSC and PAL systems chrominance information is conveyed by modualtion of a subcarrier so as to produce sidebands lying in the upper portion of the spectrum used for the transmission of luminance information. It has been found that diagonal black and white patterns that are fine enough to produce frequencies within the portion of the spectrum occupied by the subcarrier can cause a receiver to introduce colors into the image. It has therefore been proposed that the decoding circuits be modified when a purely black and white image is present, but there remains the difficulty of detecting the existence of this condition.

BRIEF SUMMARY OF THIS INVENTION

In accordance with this invention advantage is taken of the fact that the polarity of luminance signals from corresponding pixels in two fields or frames remains the same whereas the polarities of chroma signals is opposite. A circuit embodying this principle passes the signal through a band pass filter so as to select the chrominance and high frequency luminance signals. Means for determining the polarity of the signal is coupled between the filter and one input of an XOR gate, and a delay of an integral number of fields is connected between the filter and the other input of the XOR gate. When like polarities are applied to the inputs of the XOR gate, its output is low, indicating that the signal is for luminance, and when unlike polarities are applied to the inputs of the XOR gate, its output is high indicating that the signal is for chrominance. These indications occur pixel by pixel. In order to increase reliability, the outputs for a numbers of pixels are processed.

BRIEF DESCRIPTION OF THE DRAWINGS

FIG. 1 is a block diagram of a circuit embodying this invention, and

FIG. 2 illustrates one form of an output filter that may be used,

FIG. 3 illustrates an output filter,

FIG. 3A indicates the pixels processed by the filter of FIG. 3.

DETAILED DESCRIPTION OF THE INVENTION

In FIG. 1 a composite video signal is applied to the input of a band pass filter 2 so as to provide an A.C. signal $W_1$. This signal is applied to a means 4 that outputs a binary signal indicating polarity as shown by the wave $W_2$. The wave $W_2$ is applied directly to one input of an XOR gate 6 and via a field or frame delay 8 to the other input of the XOR gate 6. An output filter 10 processes the output of the XOR device 6 for a number of pixels so as to derive a reliable signal that can be used to modify the decoding circuits of a color receiver when the output of the filter 10 indicates that the video signal has no color. This occurs when the polarity of signals applied to the inputs of the XOR gate 6 are the same.

FIG. 2 illustrates one form that the polarity indicating means 4 may have. A positive coring level signal is applied to an A input of a comparator 12, and a negative coring level signal is applied to the A input of another comparator 14. The signal $W_1$ from the band pass filter 2 is applied to the B inputs of the comparators 12 and 14. The output of the comparator 12 is connected to one input of an OR gate 16, and the output of the comparator 14 is applied to an inverting input of the OR gate 16.

FIG. 3 illustrates one form that the output filter 10 may assume. It examines the polarities indicated for pixels 1 through 5 of FIG. 3A and indicates the polarity of the majority. The output of the XOR gate 6 is applied directly to one input of a summer 18, via a delay 20 of one line minus one pixel to another input via a delay 22 of one pixel to another input, via a delay 24 of one pixel to another input and via a delay 26 of one line minus one pixel to another input. Thus the polarities of pixels 1, 2, 3, 4 and 5 respectively appear at the input of the delay 20, the output of delay 20, the output of the delay 22, the output of the delay 24 and the output of the delay 26. Each polarity is either a 1 or a 0. The output of the summer 18 is applied to one input of a comparator 28, and a value of 3 logic levels is applied to the other input of the comparator 28. Thus the signal at the output of the comparator 28 has a value of one logic level if three of the five inputs to the summer 18 are unity and a lower logic level if less than three of the five inputs are unity. Thus the majority rules. The output from FIG. 3 may be used to suppress the output of the color demodulator of a receiver if the signal is determined to be luminance.

The following table indicates practical values of delays that can be used for the field-frame delay 8 in the NTSC and PAL systems:

| NTSC | 1 field = 263 lines |
|      | 1 frame = 525 lines |
| PAL  | 1 field = 312 lines |
|      | 2 frame = 1250 lines |

We claim:

1. A circuit for indicating whether a composite video signal in a television signal represents luminance or chrominance comprising
   a band pass filter for selecting the chrominance and high frequency luminance signals, said filter having an input to which a composite video signal may be applied and an output,
   means coupled to said output for determining the polarity of the signal at the output of said filter,
   an XOR gate having two inputs and an output, one input being coupled to the output of said latter means, and
   a field/frame delay coupled between the output of said means for determining polarity and the other input of said XOR gate.

2. A circuit as set forth in claim 1 having an output filter coupled to the output of said XOR gate, said filter having means for indicating the polarity of a majority of a given number of pixels in the vicinity of the pixel of interest.

* * * * *